United States Patent
Le Pechour et al.

(10) Patent No.: US 9,409,342 B2
(45) Date of Patent: Aug. 9, 2016

(54) MOULD FOR FORMING CONTAINERS, EQUIPPED WITH AN ELECTRIC HEATING SYSTEM COMPRISING A SET OF DISTINCT RESISTIVE ELEMENTS

(71) Applicant: SIDEL PARTICIPATIONS, Octeville sur Mer (FR)

(72) Inventors: Anthony Le Pechour, Octeville sur Mer (FR); Laurent Fouet, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/366,966

(22) PCT Filed: Dec. 19, 2012

(86) PCT No.: PCT/FR2012/052988
§ 371 (c)(1),
(2) Date: Jun. 19, 2014

(87) PCT Pub. No.: WO2013/093335
PCT Pub. Date: Jun. 27, 2013

(65) Prior Publication Data
US 2014/0377394 A1    Dec. 25, 2014

(30) Foreign Application Priority Data
Dec. 23, 2011    (FR) ...................................... 11 62419

(51) Int. Cl.
*B29C 49/64*     (2006.01)
*B29C 49/78*     (2006.01)
*B29C 49/38*     (2006.01)
*B29C 49/48*     (2006.01)
*B29C 35/02*     (2006.01)

(52) U.S. Cl.
CPC ............. *B29C 49/6445* (2013.01); *B29C 49/38* (2013.01); *B29C 49/4823* (2013.01); *B29C49/786* (2013.01); *B29C 2035/0211* (2013.01); *B29C 2949/78151* (2013.01); *B29C 2949/78294* (2013.01); *B29C 2949/78344* (2013.01); *B29C 2949/78495* (2013.01); *B29C 2949/78663* (2013.01)

(58) Field of Classification Search
CPC ........... B29C 2949/78151; B29C 2949/78294; B29C 2949/78344; B29C 2949/78495; B29C 2949/78663; B29C 49/6445; B29C 49/786; B29C 2035/0211; B29C 49/4823
USPC .................................................. 425/144, 526
See application file for complete search history.

(56) References Cited

U.S. PATENT DOCUMENTS 2,582,260 A    1/1952  Kutik
4,871,507 A    10/1989 Ajmera
(Continued)

FOREIGN PATENT DOCUMENTS

DE    10 2009 022374 A1    11/2010
EP         1 753 597 A1     2/2007
(Continued)

OTHER PUBLICATIONS

International Search Report of PCT/FR2012/052988 dated Apr. 4, 2013.

*Primary Examiner* — Robert J Grun
(74) *Attorney, Agent, or Firm* — Sughrue Mion, PLLC (57) ABSTRACT

Mold for forming containers from blanks of plastic material. The mold includes a shell delimiting a cavity with the impression of a container extending around a central axis, and a system for heating the shell. The heating system includes at least one set of different resistive elements that are superimposed substantially parallel to the central axis and of similar topology, the heating system being arranged to dissipate a different thermal energy at each resistive element of a same set.

16 Claims, 5 Drawing Sheets

(56) References Cited

U.S. PATENT DOCUMENTS 5,906,286 A * 5/1999 Matsuno et al. ............. 215/375
7,775,786 B2 * 8/2010 Zoppas .................. B29C 33/02
                                               249/78

FOREIGN PATENT DOCUMENTS

| WO | 94/06617 A1 | 3/1994 |
| WO | 2011/091780 A2 | 8/2011 |

* cited by examiner

MOULD FOR FORMING CONTAINERS, EQUIPPED WITH AN ELECTRIC HEATING SYSTEM COMPRISING A SET OF DISTINCT RESISTIVE ELEMENTS

CROSS REFERENCE TO RELATED APPLICATIONS

This is a National Stage of International Application No. PCT/FR2012/052988 filed Dec. 19, 2012, claiming priority based on French Patent Application No. 11 62419 filed Dec. 23, 2011, the contents of all of which are incorporated herein by reference in their entirety.

The invention concerns the manufacture of containers by blow molding or stretch blow molding blanks made of plastic material such as PET (polyethylene terephthalate).

The technique of blow molding a container comprises, firstly, an operation of heating a blank (whether a preform or an intermediate container having undergone a first blow molding operation from a preform) at a predetermined temperature higher than the glass transition temperature of the material of which the blank is made.

Secondly, the blank thus heated is inserted into a mold having a wall delimiting a cavity with the impression of the container, and an operation is performed of blow molding the blank by injecting a fluid therein (generally air) under pressure (said pressure being generally between 20 and 40 bars).

A stretching operation can be included during blow molding, consisting of stretching the blank by means of a sliding rod, ensuring that the container is maintained in the axis of the mold.

Some containers must be resistant to heat in order to allow their hot filling. These containers are referred to as "HR" or heat-resistant. To increase the resistance of the material to deformations caused by the rising temperature during filling, a known technique consists of thermally increasing the crystallinity of the material. In practice, the wall of the mold is heated to a relatively high temperature (above 100° C., and generally on the order of 130° C. to 160° C.). Upon completion of the blow molding, the container is maintained in contact with the wall of the mold for a predetermined period of time. The transfer of heat between the wall and the container causes an increase in the crystallinity of the material. This technique is called heat set.

Two principal techniques for heating the mold in order to heat set containers are known.

The first technique consists of circulating a preheated fluid in the wall of the mold (particularly water or oil).
This proven technique is very widely used. However, it has a number of disadvantages. Firstly, because of the sizable thermal exchanges taking place between the wall of the mold and the containers, it requires a high flow rate of fluid (and therefore a large supply). Secondly, the circulation of the fluid in the mold requires that complex channels be made in the wall of the mold.

A second technique consists of heating the mold by means of an electrical resistance, the heat furnished to the mold being dissipated by the Joule effect. Thus, European patent EP 1,753,597 describes a mold carrier on which, at an interface with a mold with the impression of the container, an electrical resistance in the form of a coil is attached, having transverse sections situated near the ends of the mold.

This technique, which is not widely used to date, is also not without disadvantages. Firstly, because of the disposition of the resistance at the interface between the mold and its carrier, a large part of the heat dissipated by Joule effect is simply lost, which reduces the energy efficiency of the heating. Secondly, the coil form of the resistance requires a complex machining of the mold carrier. The smaller the tolerances associated with the mold, the more complex this machining becomes, since in order to minimize leaks, it seems desirable to maximize the contact surface between the resistance and the carrier. More generally, the technique described in the aforementioned European patent does not enable the temperature of the mold to be reliably regulated.

A first objective is to improve the energy efficiency of the electrical heating of a mold.

A second objective is to simplify the manufacture of a mold equipped with an electrical heating system.

A third objective is to enable better regulation of the temperature of the mold.

To that end, proposed firstly is a mold for forming containers from blanks of plastic material, which comprises a shell delimiting a cavity with the impression of a container extending around a central axis, and a system for heating the shell, the heating system comprising at least one set of different resistive elements that are superimposed substantially parallel to the central axis and of similar topology, the heating system being arranged to dissipate a different thermal energy at each resistive element of a same set.

Such a mold, which includes the heating system, in particular offers an energy efficiency that is greater than known electric heating molds. Moreover, it makes it possible to heat the container by superimposed zones, thus benefiting the precision of heating and ultimately the quality (and performance) of the container.

Proposed secondly is a unit for forming containers from preforms made of plastic material, which comprises at least one such mold, or a plurality of such molds mounted on a common carousel.

Various additional characteristics can be foreseen, alone or in combination:
- the resistive elements of a same set have different intrinsic resistances;
- each resistive element is generally cylindrical in shape, and extends substantially parallel to the central axis;
- each set of resistive elements is in the form of a unitary radiant element;
- each radiant element is in the form of a cylindrical rod inserted into a complementary hole formed [in] the shell;
- each resistive element is generally toroidal in shape in revolution around the central axis;
- the resistive elements of a same set are mounted in series in a common electrical circuit;
- the resistive elements of a same set are mounted in parallel in a common electrical circuit;
- the electrical circuit is controlled by a control unit;
- the control unit is connected to a thermal sensor (temperature probe mounted in the mold, or thermal camera mounted outside the mold) configured to take the temperature in at least one of the zones of the cavity situated in front of the resistive elements;
- each resistive element is mounted in an independent electrical circuit.

Other objects and advantages of the invention will appear from the following description of a preferred embodiment, with reference to the appended drawings in which.

Figure 1:
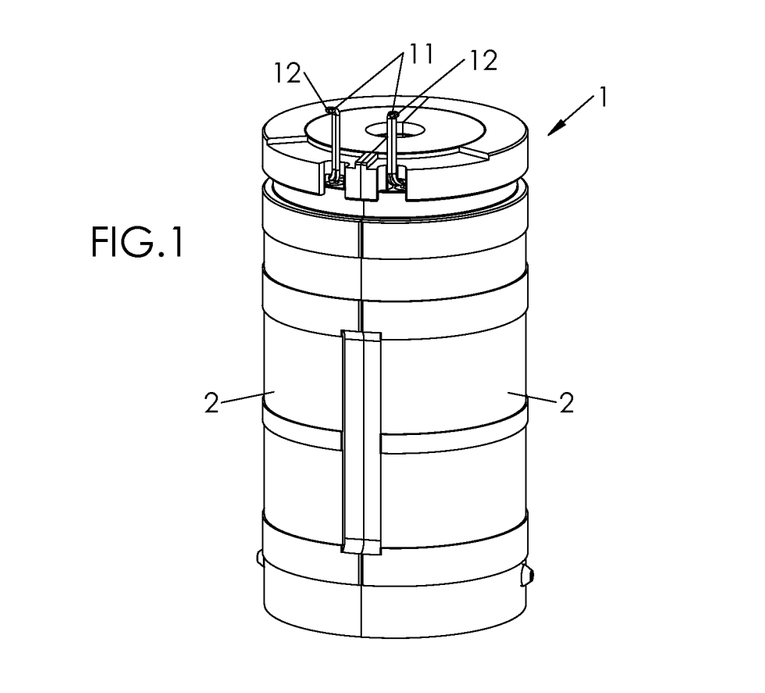
FIG. 1 is a view in perspective showing an assembled mold for forming containers from blanks.

Represented in FIG. 1 is a mold 1 for forming containers from blanks (this generally involves preforms) of plastic material. Said mold 1 is intended to be integrated into a container-forming unit, which comprises a carousel, for example, at the periphery of which several molds 1 are mounted.

Figure 3:
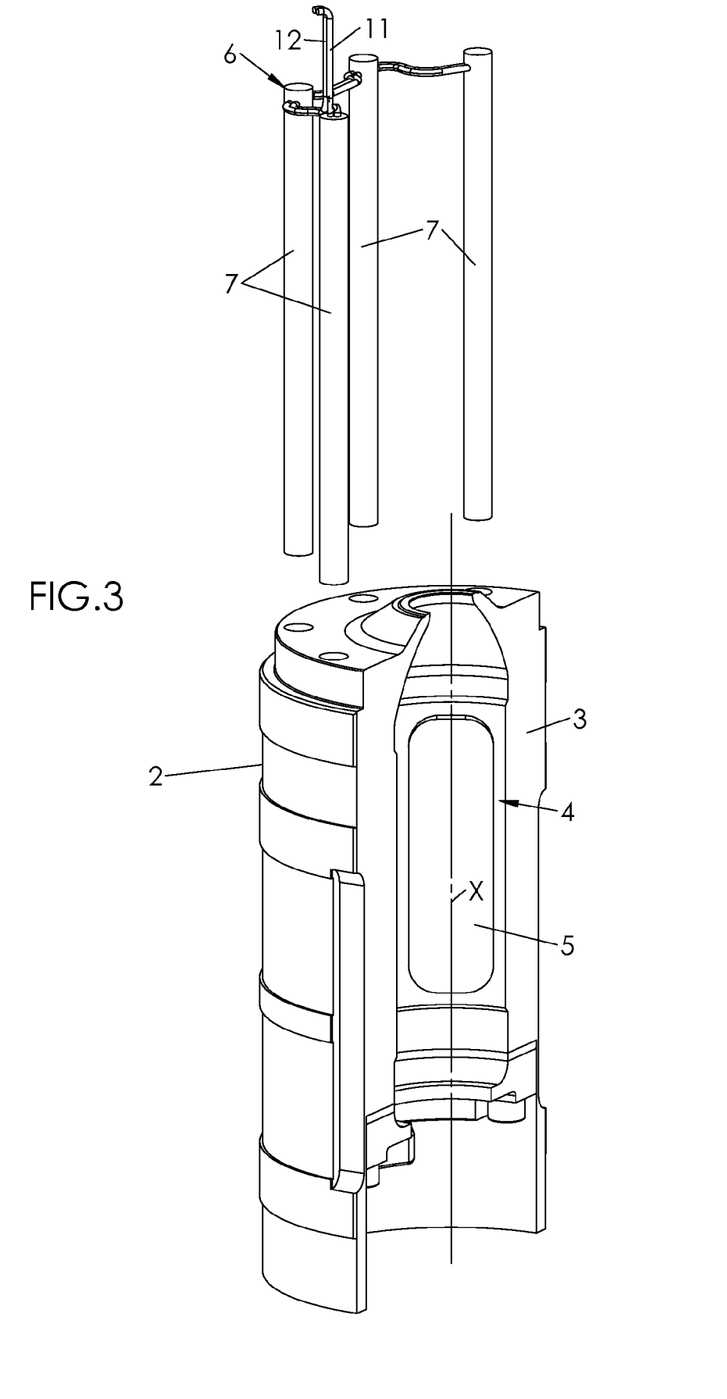
FIG. 3 is a partial exploded view in perspective showing a shell of the mold of FIGS. 1 and 2, illustrating the structure of the electrical heating system of the mold.

Said mold 1 is a book mold and comprises two half-molds 2 (also called shells) removably attached to two respective shell holders (not shown) mounted articulated in rotation with respect to each other around a common hinge. FIG. 3 shows a single shell 2, represented in exploded form.

Each shell 2 is produced from a single piece of metal material such as steel or aluminum alloy. A cavity 4 with the impression of a final container to be formed, extending around a central axis of symmetry X, is formed in the shell 2 from a flat face 3 forming an interface between the shells 2.

The containers to be formed are the HR type, that is, they have good mechanical resistance to deformation during hot filling. This resistance is conferred to each container by thermally increasing its rate of crystallinity, this process—called heat setting—being made possible by setting the temperature of the mold 1 to a high temperature (above 100° C., and preferably between 130° C. and 160° C.).

According to a particular embodiment, the final container has panels intended to absorb the deformations during filling. Said panels are for example formed by a series of inserts 5 removably mounted in the cavity 4, in receptacles provided for that purpose.

In practice, upon completion of forming, heat setting consists of maintaining the container pressed against the wall of the cavity 4 for a predetermined period of time.

In order to maintain the temperature of the shells 2 at a high temperature, the mold 1 comprises an electrical heating system 6 for each shell 2.

Said heating system 6 comprises, for each shell 2, at least one set 7 of different resistive elements or resistors 8.i (where i is a whole number between 1 and N, N being a whole number greater than 1, N being equal to 3 in the illustrated embodiment), superimposed substantially parallel to the central axis X and of similar topology, located facing different corresponding adjacent zones 9.i of the cavity 4. The topology of two elements is said to be similar when they have the same geometric properties. Thus, two cylinders of revolution are considered to be of similar topology, as are two tori of revolution. By contrast, a cylinder of revolution and a torus of revolution have dissimilar topologies.

The heating system 6 is arranged to dissipate by Joule effect a different thermal energy at each resistor 8.i of a same set 7, in order to heat and regulate the temperature of the superimposed adjacent zones 9.i at different temperatures.

Each resistor 8.i comprises an electrical conductor in the form of a spiral (or solenoid) winding around a guide curve C, embedded in a dielectric insulator made of a refractory material offering good thermal conductivity while still having high electrical resistance. In a conventional way, the conductor can be made of an alloy of nickel and chrome.

Figure 2:
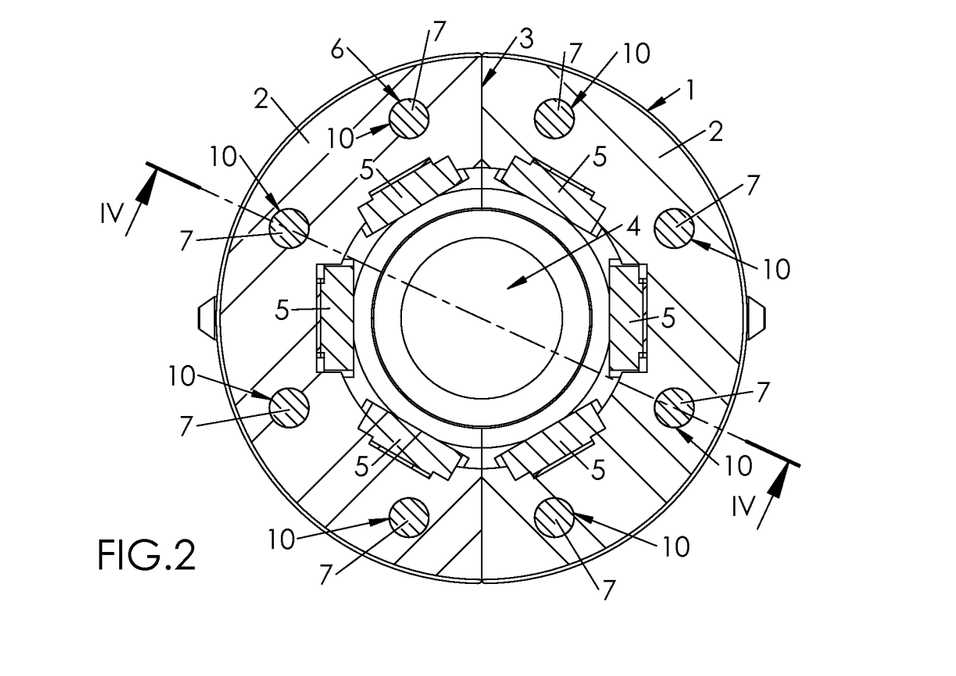
FIG. 2 is a view in transverse cross-section of the mold of FIG. 2 [sic]
Figure 4:
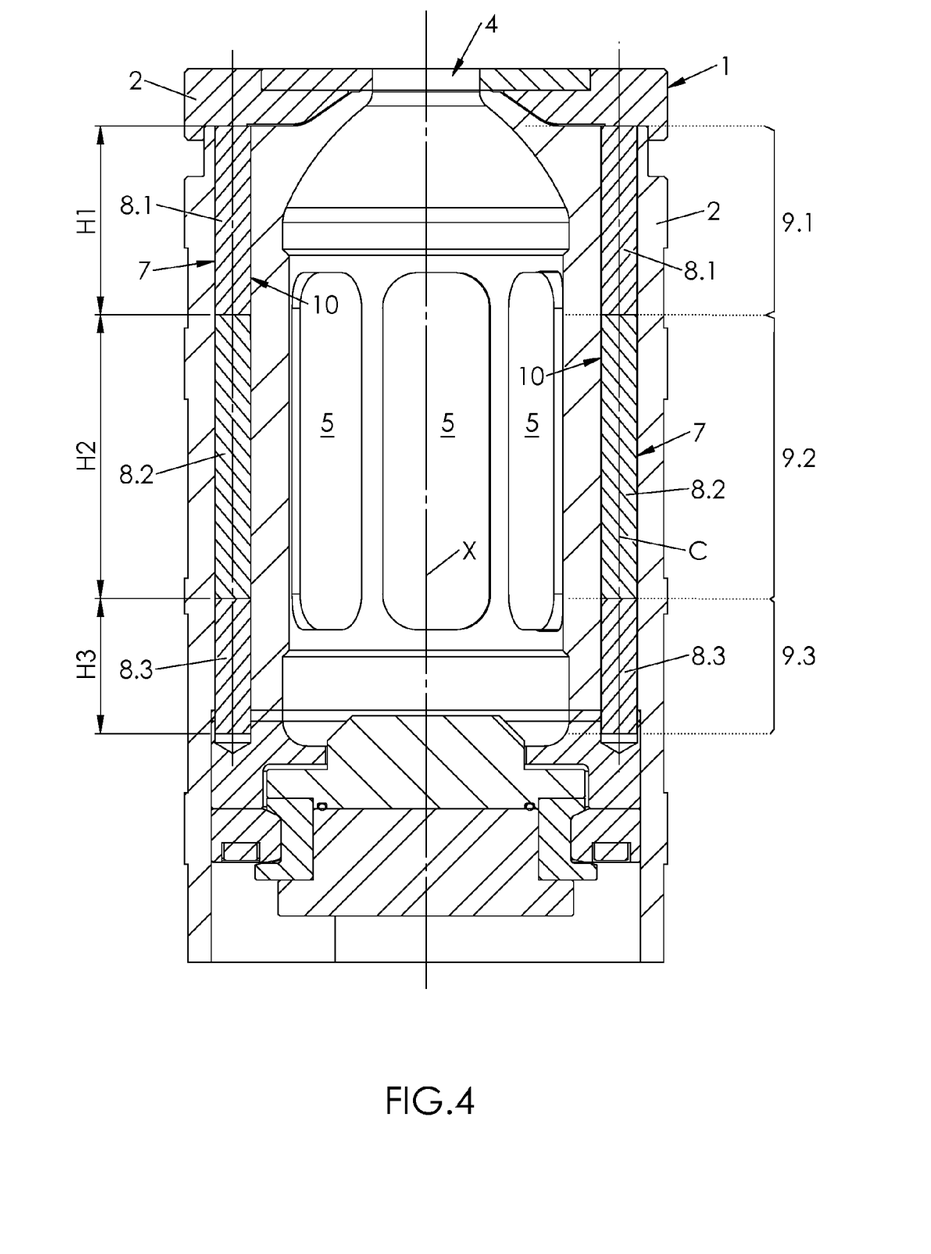
FIG. 4 is a view in cross-section of the mold of FIG. 2, along the cutting plane IV-IV.

According to a preferred embodiment illustrated in FIGS. 2 to 4, the topology of each resistor 8.i is straight, i.e., the guide curve C of the resistor 8.i is a straight segment, resulting in the resistor 8, in large scale (i.e., the scale of the mold), being cylindrical of revolution.

Figure 5:
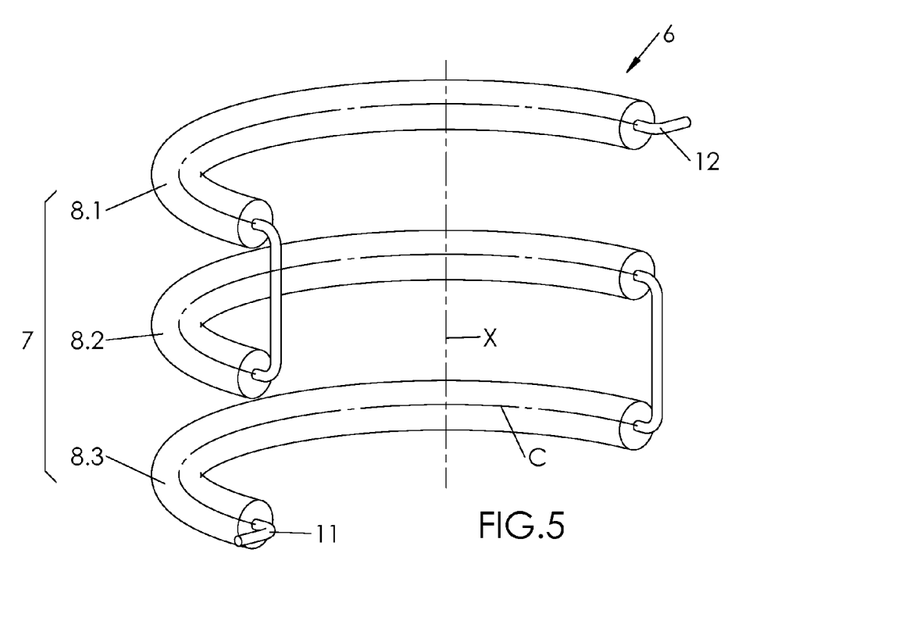
FIG. 5 is a view in perspective showing a set of resistive elements according to one variant of embodiment in which each resistive element is toroidal in shape.

In a variant illustrated in FIG. 5, the guide curve C is an arc of circle, each resistor 8.i consequently being a large-scale torus.

By convention, intrinsic resistance, denoted $R_i$, is the electrical resistance of each resistor 8.i measured per unit of length of arc of its guide curve C. The intrinsic resistance $R_i$ is provided by the following formula:

$$R_i = \rho \frac{l_i}{A}$$

where:
$R_i$ is the electrical resistance of the resistor 8.i, measured per unit of length of arc of the guide curve, in ohms [Ω];
$\rho$ is the resistivity of the material, measured in ohm-meter [Ω·m]
$l_i$ is the developed length of the spiral winding measured over a unit of length of arc of the guide curve C of the resistor 8.i, expressed in meters [m];
A is the cross-section of the resistor 8.i, expressed in square meters [m²].

The superimposed resistors 8.i of a same set 7 have a similar topology (particularly cylindrical in the example of FIGS. 2 to 4, or toric in the example of FIG. 5) while preferably having different respective intrinsic electrical resistances $R_i$.

Represented in FIGS. 2, 3 and 4 is a preferred physical configuration in which each resistor 8.i is cylindrical, i.e., the guide curve C of the conductor is a straight segment.

Figure 6:
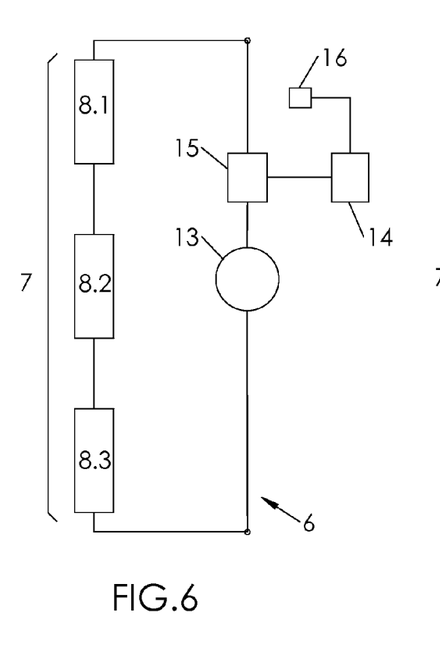
FIG. 6 is a diagram illustrating, according to a first embodiment, the electrical configuration of the heating system in which the resistors of a same set are mounted in series.
Figure 7:
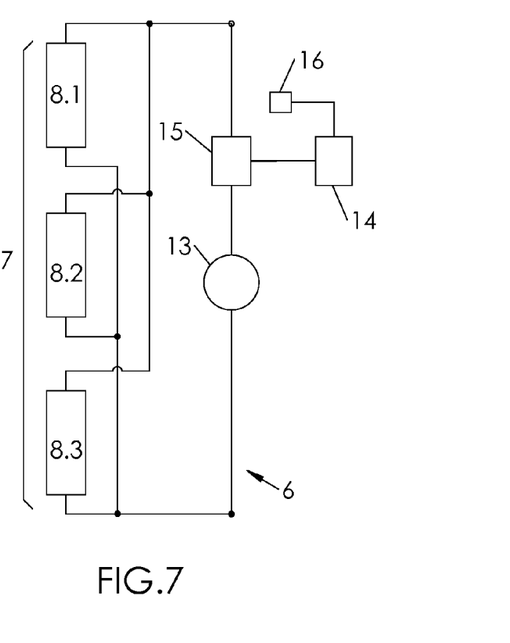
FIG. 7 is a diagram illustrating, according to a second embodiment, the electrical configuration of the heating system in which the resistors of a same set are mounted in parallel.
Figure 9:
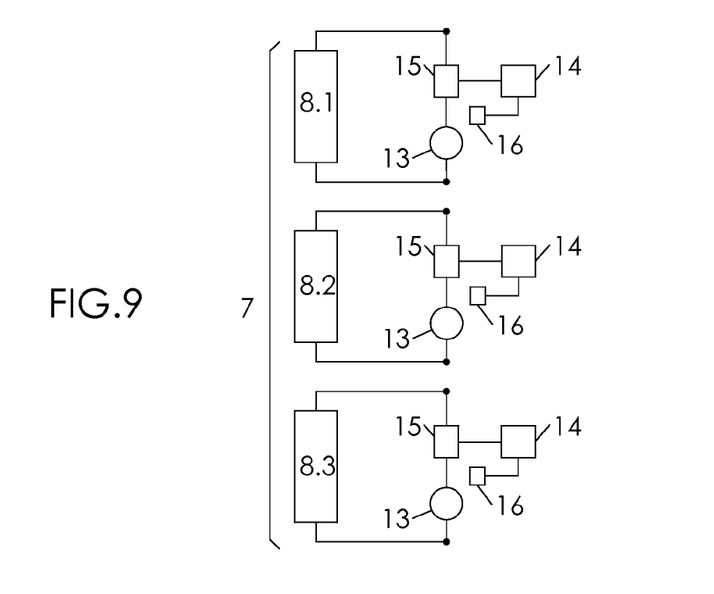
FIG. 9 is a diagram illustrating, according to a third embodiment, the electrical configuration of the heating system in which the resistors of a same set are connected to different electrical circuits.

As can be clearly seen in the figures, each set 7 in this configuration constitutes a unitary radiant element in the form of a cylindrical rod each comprising several (three in this instance) coaxial resistors 8.i that can be mounted in a same electrical circuit, in series or in parallel as illustrated respectively in FIGS. 6 and 7, or independently in different electrical circuits as illustrated in FIG. 9.

Each rod 7 is mounted in a complementary shaped cylindrical hole 10 in the shell 2 over substantially the whole height thereof, parallel to the central axis X of the cavity 4. As can be seen in FIG. 2, the rods 7, in this instance five in number, are regularly distributed in a circle at the periphery of the shell 2, at a substantially equal distance from the central axis X.

The hole 10 has a diameter slightly greater than the outside diameter of the rod 7, although the clearance between them is sufficiently small (depending on what manufacturing tolerances permit) to maximize the contact between the rod 7 and the shell 2, and thus limit thermal leaks and improve the energy efficiency of the mold 1.

As illustrated in FIG. 4, the resistors 8.*i* within a same rod 7 extend over respective heights Hi, which can be different, and they each correspond to a particular heating zone 9.*i* of the cavity 4.

Thus, in the example illustrated in FIG. 4, each rod 7 comprises:

a first resistor 8.1, of intrinsic resistance denoted $R_1$, which extends over a first height H1, at an upper heating zone 9.1 corresponding to the impression of a shoulder of the container to be formed, to be heated to a first predetermined temperature T1;

a second resistor 8.1, of intrinsic resistance denoted $R_2$, which extends over a second height H2, at an intermediate heating zone 9.2 corresponding to the impression of a body of the container to be formed, to be heated to a second predetermined temperature T2;

a third resistor 8.3, of intrinsic resistance denoted $R_3$, which extends over a third height H3, at a lower heating zone 9.3 corresponding to the impression of the bottom of the container to be formed, to be heated to a third predetermined temperature T3.

In order to vary the temperature of the shell 2 according to the height thereof, it will preferably be ensured that each resistor 8.*i* has a different intrinsic electrical resistance:

$R_1 \neq R_2 \neq R_3$ preferably with:

$R_1 \neq R_3$

Specifically, according to a particular embodiment, each rod 7 comprises a single electrical conductor having several successive sections end-to-end with different intrinsic resistances per unit of length of arc of the guide curve (rectilinear in this instance), each forming a different resistor 8.*i*. In this way, the electrical power dissipated by Joule effect and per unit of length by two adjacent conductors varies from one conductor to another (i.e., from one resistor 8.*i* to another). The result is that the heating temperature is different for each zone 9.*i* of the cavity 4.

The variation of intrinsic resistance of each rod 7 can be done, assuming the spiral winding is of only one material, by varying the density of the winding of the conductors (i.e., by varying the developed length of the conductor per unit of length of the guide curve C), or by varying the cross-section of the conductor.

The resistors 8.1 of a same rod 7 can be mounted in series (as illustrated in the block diagram of FIG. 6) or in parallel (as illustrated in the block diagram of FIG. 7) in a same electrical circuit comprising an outgoing conductive wire 11 and a return conductive wire 12. The wires 11, 12 are preferably connected to an electrical terminal that can be integrated into a terminal block (not shown).

As a variant, the resistors 8.1 can be independent (as illustrated in the block diagram in FIG. 9) and integrated into independent electrical circuits. In this case, their intrinsic electrical resistances $R_i$ can be identical, the power variation from one resistor to another resulting from a variation of the amperage or of the voltage supplying them.

The (or each) electrical circuit is supplied with current by a generator 13.

In order to vary and regulate the dissipated power at each resistor 8.*i*, the electrical circuit is connected to a control unit 14 through a variator 15 that is phase-angle controlled, or preferably wave-train controlled. In this case, the variator comprises a switch alternately allowing and cutting off current from the mains for respective predetermined periods of time. The control unit 14 is programmed to regulate the ratio of times of allowing and cutting off current.

According to a preferred embodiment, the control unit 14 provides the setting and regulation of the power (by the variator 15) by feedback based on a temperature parameter, for example, so that the temperature in front of one of the zones 9.*i* of the cavity 4, measured by means of at least one thermal sensor 16 such as a thermocouple or a probe (for a single temperature measurement) or a thermal camera (for thermal mapping) connected to the control unit 16 [sic: 14]—and more specifically to the variator 15.

In the electrical assembly of FIG. 6, the electrical powers Pi dissipated by each resistor 8.*i* are all, according to Ohm's law, proportional to the resistance $R_i$ and to the square of the amperage I in the circuit:

$$P_i = R_i I^2$$

In the electrical assembly of FIG. 7, the electrical powers $P_i$ dissipated by each resistor 8.*i* are all, according to Ohm's law, proportional to the inverse of the resistance $R_i$ and to the square of the voltage V at the terminals of the circuit:

$$P_i = \frac{V^2}{R_i}$$

Because the average temperatures T1, T2 and T3 in each of the zones 9.*i* is proportional to the dissipated powers, it is possible to obtain feedback via the control unit 14 about the current I in the circuit (respectively the voltage V at the terminals at its terminals [sic]).

Figure 8:
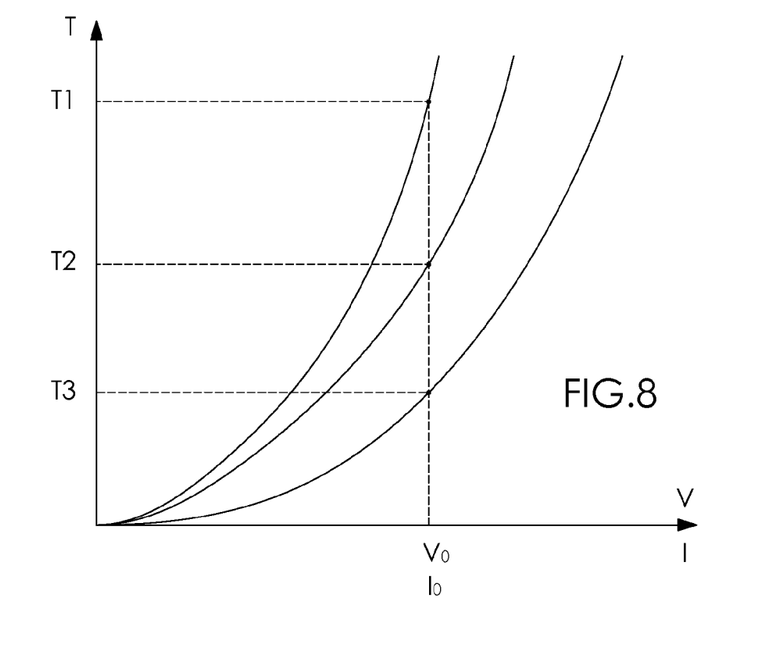
FIG. 8 is a diagram illustrating the curves of the heating temperatures corresponding to three superimposed resistors of a same set, mounted in series or in parallel, as a function respectively of the current in the circuit or the voltage at the terminals thereof.

Represented in FIG. 8 are the laws of variation of the temperatures T1, T2 and T3 as a function of the amperage I (in the case of a circuit in series, FIG. 6), respectively of the voltage U (in the case of a circuit in parallel, FIG. 7).

Clearly, the system 6 functions on a one-to-one basis, that is, at a given amperage $I_0$ (respectively at a voltage $V_0$), there is a unique triplet of temperatures T1, T2, T3 in the superimposed zones 9.*i* of the cavity 4, and vice versa.

For series and parallel connection, a single probe 16 is therefore sufficient since the regulation cannot be conducted separately for each zone 9.*i*. The value of the resistance of each resistor 8.*i* is chosen based on the desired temperature profile, which itself is a function of the amperage (for a series assembly) or voltage (for a parallel assembly).

The probe 16 can be mounted in the shell 2 at any of the zones (for example the upper zone 9.1). As a variant, a thermal camera can be mounted at the outlet of the mold 1, facing the open cavity 4. For example, the temperature T1 of the upper heating zone 9.1 is set at a value of between 100° C. and 160° C., and particularly about 130° C.

According to an alternate embodiment, illustrated diagrammatically in FIG. 9, the resistors 8.*i* are connected to different electrical circuits each comprising an independent generator 13.

The physical configuration of the sets 7 can still conform to the description above, with reference to FIGS. 2 to 4 or 5.

In this case, it is possible to set and regulate the temperature of each zone 9.*i* independently, by means of a control unit 14 connected to a thermal sensor 16 (such as a probe mounted in the shell in front of each zone 9.*i*, or a thermal camera mounted at the outlet of the mold 1 and scanning all of the zones 9.*i* in order to evaluate the respective temperature therein). According to a preferred embodiment, a variator 15 controlled by the control unit 14 is mounted in each circuit to vary the dissipated power by wave train.

The following common advantages are the result of the architectures that have just been described.

Firstly, it is possible to achieve a precise thermal zoning of the mold 1, that is, to thermally regulate the heating temperature of an HR container by superimposed zones 9.i within the mold 1.

Secondly, said zoning can be regulated precisely as a function of the amperage in the electrical circuit of the heating system, or of the voltage at the terminals of the circuit.

Thirdly, because the heating elements 7 are mounted directly in the shell, thermal leaks are minimized and the energy efficiency of the electrical heating of the mold 1 is better.

Fourthly, in the case of cylindrical rods 7, the manufacture of the shell 2 to enable the assembly of the heating system is relatively simple, since simple cylindrical holes 10 are sufficient (although respecting small dimensioning tolerances so as to maximize the effective contact surfaces between the rods and the wall of the shell 2).

The invention claimed is:

1. A mold for forming containers from blanks of plastic material, which comprises a shell delimiting a cavity with an impression of a container extending around a central axis, and a heating system for heating the shell, wherein the heating system comprises at least one set of different resistive elements that are superimposed substantially parallel to the central axis and of similar topology, the heating system being arranged to dissipate a different thermal energy at each resistive element of a same set, each set of different resistive elements being in the form of a unitary radiant element having a form of a cylindrical rod inserted into a complementary hole formed in the shell or being generally toroidal in shape in revolution around the central axis.

2. The mold according to claim 1, characterized in that the resistive elements of a same set have different intrinsic resistances.

3. The mold according to claim 1, characterized in that each resistive element is generally cylindrical in shape, and extends substantially parallel to the central axis.

4. The mold according to claim 3, characterized in that each set of resistive elements is in the form of a unitary radiant element.

5. The mold according to claim 4, characterized in that each radiant element is in the form of a cylindrical rod inserted into a complementary hole formed in the shell.

6. The mold according to claim 2, characterized in that each resistive element is generally toroidal in shape in revolution around the central axis.

7. The mold according to claim 1, characterized in that the resistive elements of a same set are mounted in series in a common electrical circuit.

8. The mold according to claim 1, characterized in that the resistive elements of a same set are mounted in parallel in a common electrical circuit.

9. The mold according to claim 7, characterized in that the electrical circuit is supplied by a current generator connected to a control unit.

10. The mold according to claim 9, characterized in that the control unit is connected to a thermal sensor such as a thermocouple mounted in the mold, or a thermal camera mounted at the outlet of the mold and configured to take the temperature in at least one of the zones of the cavity situated in front of the resistive elements.

11. The mold according to claim 1, characterized in that each resistive element is mounted in an independent electrical circuit.

12. A unit for forming containers from preforms of plastic material, comprising at least one mold according to claim 1.

13. The unit according to claim 12, comprising a plurality of molds, mounted on a common carrousel.

14. A mold for forming containers from blanks of plastic material, comprising:
a shell defining a mold cavity about a central axis; and
heating system for heating the shell, the heating system comprising a set of different resistive elements that are superimposed in a direction substantially parallel to the central axis, each resistive element when energized dissipating a different thermal energy, the set of different resistive elements forming a unitary structure in a form of a cylindrical rod that is inserted into a complementary hole in the shell or arcs of circles about the central axis and spaced along the central axis.

15. The mold according to claim 14, wherein the set of different resistive elements as a whole form a unitary structure in a form of a cylindrical rod that is inserted into the complementary hole in the shell, the complementary hole extending in a direction substantially parallel to the central axis.

16. The mold according to claim 14, comprising at least two sets of different resistive elements, each set of different resistive elements in the form of arcs of circles about the central axis and spaced along the central axis so as to form, as a whole, a toroidal structure.

* * * * *